June 6, 1967   W. Z. SALCER   3,323,976
INTERMEDIATE ARTICLE FOR MAKING PLASTIC ARTICLES
Original Filed March 25, 1963   4 Sheets-Sheet 1
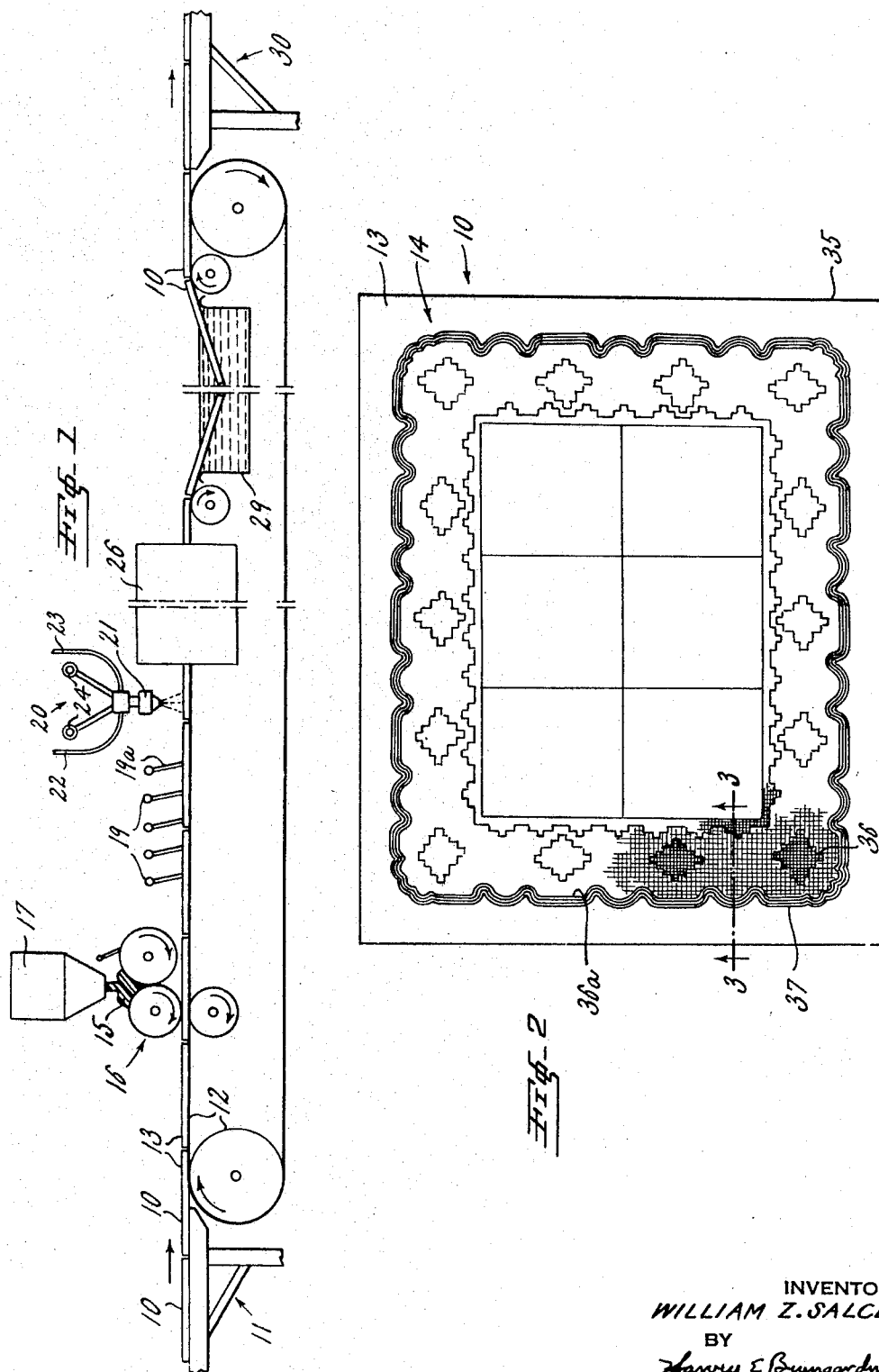
INVENTOR
WILLIAM Z. SALCER
BY
Harvey E Bumgardner Jr
ATTORNEY

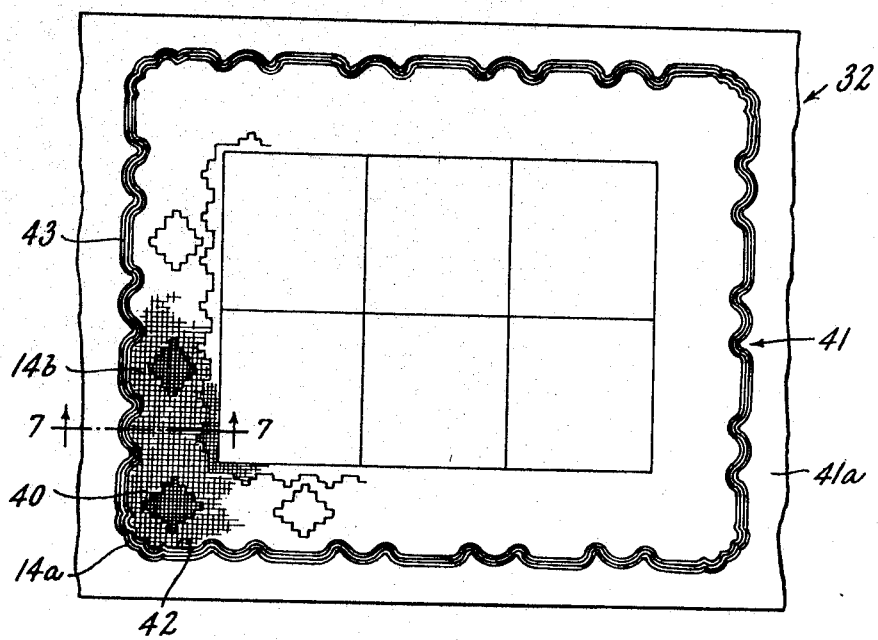

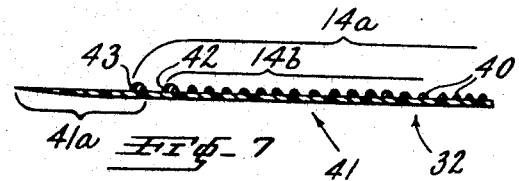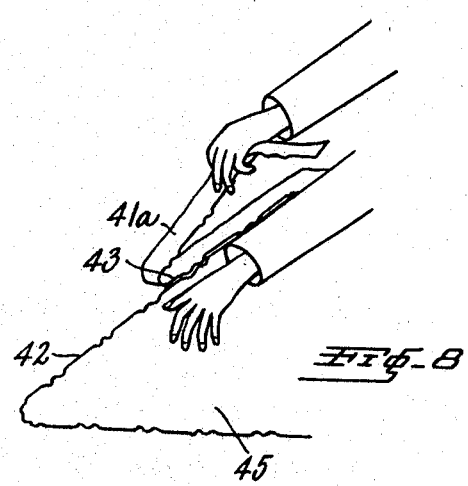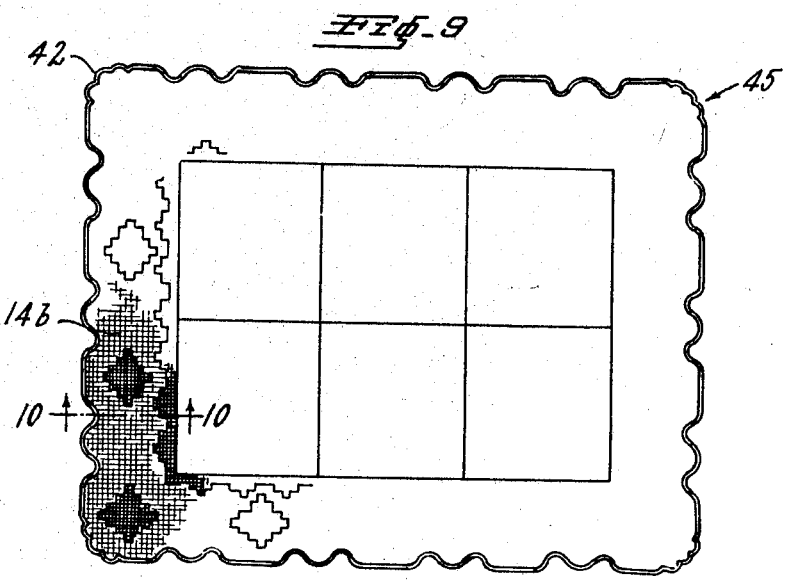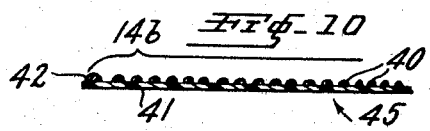

United States Patent Office 3,323,976
Patented June 6, 1967

3,323,976
INTERMEDIATE ARTICLE FOR MAKING PLASTIC ARTICLES
William Z. Salcer, Forest Hills, N.Y., assignor to B. & S. Plastic Art, Inc., Jersey City, N.J., a corporation of New Jersey
Application June 26, 1964, Ser. No. 378,248, which is a division of application Ser. No. 267,755, Mar. 25, 1963, now Patent No. 3,150,216, dated Sept. 22, 1964. Divided and this application Sept. 28, 1965, Ser. No. 490,949
3 Claims. (Cl. 161—118)

This application is a division of my application Ser. No. 378,248, filed June 26, 1964, which, in turn, is a division of my application Ser. No. 267,755, filed Mar. 25, 1963, now U.S. Patent No. 3,150,216.

This invention relates to a method of manufacturing flexible sheet like articles having a raised pattern on one surface thereof and to a mold particularly suited to said method of manufacture and, finally, to an intermediate article of manufacture resulting at one stage in the practice of said method and having a novel structure particularly suited to the completion of said method. More particularly, it relates to a method of manufacture, from plastic materials, of such articles as tablecloths, place mats, doilies, shower curtains, drapes, aprons and the like comprised of a perforated lace like, three dimensional plastic pattern bonded to a backing sheet of flexible plastic material or to a layer of plastic foam or to both. Said invention further relates to a mold or die in which said pattern can be formed and to which said plastic sheet or foam layer can thereafter be applied. Finally, said invention relates to a semi-finished article in which said pattern is surrounded by excess plastic sheet or foam material not desired in the finished article, said semi-finished article having a novel structure permitting fast, economical removal of said unwanted material. The plastic materials with which this invention may be useful include soft rubbers as well as a variety of flexible thermoplastic and thermosetting materials.

Small place mats having a perforated lace like raised pattern bonded to a backing sheet of contrasting color are believed to be presently on the market. But where, as in many lace patterned articles, it is desired to provide an article having irregular or scalloped edges on a large article, serious problems have heretofore been encountered in the economical manufacture of such articles. These problems have particularly resulted from conforming the edges of the backing sheet or layer to the indentations of the edges of the lace like pattern.

Accordingly, it is an object of the present invention to provide a new and improved economical method of manufacturing articles of the character described herein.

It is another object of this invention to provide a novel method of manufacturing flexible, sheet like articles comprised of a lace like three dimensional pattern bonded to a backing sheet or layer of contrasting color, all from plastic materials, particularly where said pattern has irregular or indented edges and it is desired to conform the edges of said backing sheet or layer to the edges of said pattern.

It is a further object of this invention to provide an intermediate article of manufacture having a structure particularly suited to the fast, economical removal of unwanted backing material from around the edges of said backing sheet or layer to conform the edges of said backing sheet or layer to the edges of said pattern.

It is a still further object of this invention to provide a mold or die particularly suited to the manufacture of said intermediate article of manufacture in the pursuance of the method of this invention.

For a better understanding of the present invention together with other and further objects thereof, reference is had to the following description, taken in connection with the accompanying drawings, and its scope will be pointed out in the appended claims.

In the drawings:

FIG. 1 is a diagrammatic representation of apparatus suited to the practice of the method of manufacture of this invention.

FIG. 2 is a top plan view of the mold or die of this invention showing the edges of the die pattern engraved thereon and showing, in a fragmentary manner and schematically the die pattern engraved within said edges.

FIG. 3 is a sectional view of a portion of said die taken on line 3—3 of FIG. 2.

FIG. 4 is a sectional view similar to FIG. 3, but showing both the pattern material and the backing material applied to the die.

FIG. 5 is a schematic view of a mold stripping step of the method of this invention.

FIG. 6 is a plan view of the intermediate article of manufacture of this invention showing the edges of the intermediate pattern thereon and a fragmentary, schematic representation of the finished pattern within said edges.

FIG. 7 is a sectional view of a portion of said intermediate article taken along line 7—7 of FIG. 6.

FIG. 8 is a schematic fragmentary representation of the step of the inventive method which results in separating unwanted backing material from the finished article.

FIG. 9 is a plan view of the finished article showing a fragmentary, schematic representation of the finished pattern thereon.

FIG. 10 is a sectional view on line 10—10 of FIG. 9.

Figure 11:
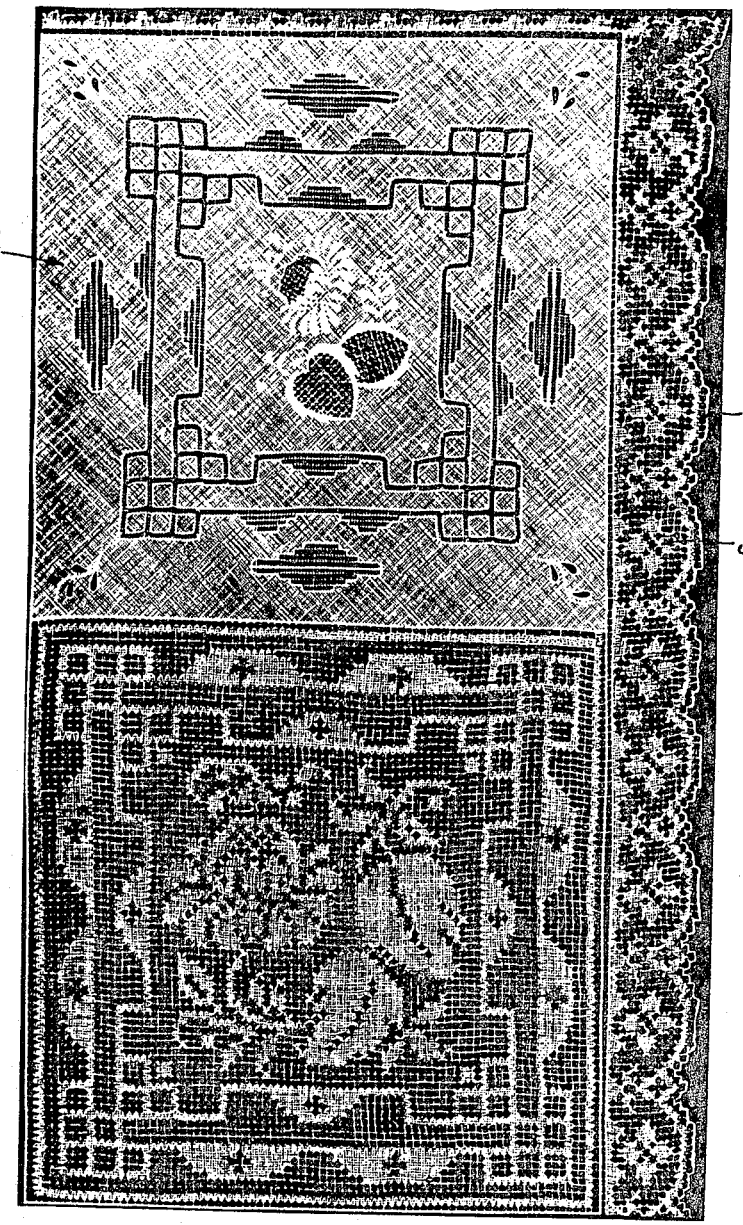
FIG. 11 is a photograph of a pattern layer only showing a type of finished pattern in connection with the manufacture of which the instant invention is useful.

Referring now to the drawings wherein like reference numerals denote corresponding elements throughout the several views, and particularly to FIG. 1, in the practice of applicant's method, a succession of plate type dies 10, each similar to that shown in FIG. 2, are fed from a loading station 11 onto a moving endless conveyor means 12, each of the dies 10 being positioned on said conveyor means 12 with its surface 13 bearing the engraved die pattern 14 uppermost.

Passing along the conveyor means 12, the uppermost surface 13 of each successive die 10 is coated with a first or pattern layer of plastic material 15 by the reverse roll coater 16 to which said plastic material is continuously supplied from a suitable reservoir 17. While, as explained elsewhere herein, my invention would be useful in the manufacture of articles from a variety of plastic materials, a vinyl dispersion plastisol has been found well suited as a raw material in the practice of the invention. This first layer of plastic material 15 completely fills the die pattern 14 on the dies 10 with excess material deposited on the upper surfaces 13 of said dies 10.

The coated dies 10 next are moved progressively beneath a series (five are shown here for purposes of illustration) of doctor blades 19 which gradually wipe the excess plastic material of the first layer from the upper surface 13 of each die 10. As each die 10 leaves the downstream doctor blade 19a, its upper surface 13 has been wiped clean of excess material leaving only the die pattern 14 completely filled with the plastisol.

Next, each die 10 is successively passed beneath a means 20 for applying a backing layer of plastic material to the upper surface 13 of said die 10. For illustrative purposes said means 20 has been shown in FIG. 1 as a transversely reciprocating spray nozzle 21 fed by flexible hoses 22 and 23 with air and plastisol respectively. By means of the transversely reciprocating motion of the nozzle 21 along the guides 24, a uniform second layer of plastic material is applied to the entire upper surface 13 of each die 10. It should be appreciated that various alternative means could be used for applying the second or backing layer to the dies 10, said alternative means including a stationary spray system, a roll coater or even lamination before curing or after a partial cure, it being essentially only that the second layer material be compatible with the first layer material in the die pattern 14 so that it may be completely bonded therewith. Most desirable decorative effects are obtained when the second layer is of a color contrasting with the color of the first or pattern layer.

Next, each die 10, bearing both layers of plastic material, is conveyed through a tunnel type oven 26 where the plastic material is cured in and on the dies 10. With the vinyl plastisol used by me for both layers, a curing time of 130 seconds at 390° F. has been found to be desirable under normal conditions.

As the dies 10 bearing the semi-finished plastic articles 32 emerge from the oven 26 they may be cooled by various means including fans, water sprays and/or water immersion. For illustrative purposes, in FIG. 1 the dies 10 are shown to be cooled by successively immersing them in a tank 29 of water. After cooling, the dies 10 may be removed from the conveyor means 12 to a stripping station 30 where the semifinished article 32 may be stripped manually from the die 10 as shown in FIG. 5. After the dies 10 have been stripped they may be washed and returned, by other conveying means, to the loading station 11, the entire process heretofore described being continuously and automatically performed except for the manual die stripping step.

It will be useful at this point to consider the detailed structure of the mold or die 10 and of the semi-finished article 32 stripped therefrom before continuing with a description of the final method step of this invention. Referring, then, particularly to FIGS. 2, 3 and 11, in FIG. 11 is shown a photographic reproduction of a portion of a typical finished patern 14b' comprising the first layer of my finished article 45, in this case a place mat. It will observed that the pattern 14b' exhibits a truly lace like appearance in that, as in a textile lace or piece of open crocheted work, the individual yarns or stitches are visibly reproduced. It will be further observed that the outer edge 34 of the border 33 of said finished pattern 14b' is defined by a continuous bead simulating a continuous strand of chain stitching or the like which follows a series of intricate indentations around the periphery of the border 33. It is to such a series of border indentations that it is generally desired to have the second or backing sheet or layer of the article 45 conform.

To achieve this end a plurality of dies 10, an example of which is shown schematically in FIGS. 2 and 3, are manufactured from flat plates of metal 35, preferably of magnesium. A 3/32-inch thick plate having a surface area sufficient to accommodate the die pattern 14 with a margin of 2 to 3 inches between the edges of the die pattern 14 and the plate 35 has been found satisfactory as a die blank. On one surface of this plate 35, the entire die pattern 14 is photographically engraved by methods well known in the art thereby producing the die pattern 14 as an interconnected pattern of grooves or depressions 36 in the surface of the plate 35. For reasons further explained hereinafter it may in some cases be desirable to exaggerate slightly the depth of the groove 36a corresponding to the outer edge of the finished pattern 14b to appear on the finished article 45, although this will not always be necessary.

In the practice of the instant invention an additional continuous groove 37 not corresponding to any portion of the finished pattern 14b intended to appear on the finished article 45 is provided, as part of the die pattern 14, in the surface 13 of the die 19 external to and closely spaced from the outer edge groove 36a of that portion of the die pattern 14 corresponding to the finished pattern 14b on the finished article 45. This additional groove 37 closely follows each indentation of the outer edge groove 36a of the desired finished pattern 14b and will usually be of substantially the same cross-section. The outer groove 37 of the die pattern 14 may be formed by machining the photoengraved die 10 or by photoengraving from the original art work with an additional border line added.

It will be appreciated that the optimum depths of the grooves 36a and 37 as well as the optimum spacing therebetween depends upon a number of variables including the thickness of the backing layer or layers and such physical properties of the materials of the pattern layer and backing layer as tensile strength and elongation. With the vinyl plastisols employed by me for both the pattern and the backing sheet it has been found, for example, that a table cloth having a backing layer of .005" thickness may be satisfactorily made using a die 10 provided with grooves 36a and 37 each having a cross-sectional depth of from .040" to .050" and a cross-sectional width of from .040" to .050".

Referring now to FIGS. 4, 5, 6 and 7 and initially to FIG. 4, the intermediate article of manufacture 32 which is a subject of this invention will be described. In FIG. 4 is shown a die 10, the die pattern 14 of which is completely filled with the first layer 40 of plastisol, the excess plastisol having been wiped clean from the upper surface 13 of the die 10. The second or backing layer 41 of plastisol, preferably of a contrasting color, has been applied to the upper surface 13 of the die 10 completely covering the first layer 40 and extending therebeyond to produce a sheet of excess plastic backing material or flash 41a overlying the outermost groove 37 and surrounding the pattern 14.

After the pattern layer 40 and the backing layer 41 have been cured and cooled on the die 10 and have been hand stripped from the die 10 as shown in FIG. 5, the resultant product is the intermediate article of manufacture 32 shown in FIGS. 6 and 7. This intermediate article 32 comprises, in a cured state, the backing sheet 41 of plastic material on one surface of which is superimposed and fused thereto the desired intermediate pattern 14a of beads or ridges of the pattern layer 40 preferably of a contrasting color. The intermediate pattern 14a includes the desired finished pattern 14b, the outer edges of said finished pattern 14b being comprised of a continuous edge bead or pattern bead 42 of said pattern layer 40 completely enclosing said finished pattern 14b and connected to various interior beads thereof to form a part of said finished pattern 14b. Also superimposed on said backing sheet 41 as part of the intermediate pattern 14a is a continuous flash bead 43 of said pattern layer 40 positioned in closely spaced relationship exterior to said edge bead 42 of said finished pattern 14b and completely surrounding the same. The dimensions of the edge bead 42 and the flash bead 43 as well as the space between them will, of course, approximate the corresponding dimensions of the grooves 36a and 37 in the die 10. The unwanted side scrap or flash 41a extends from the interior edge of the flash bead 43 to the edges of the backing sheet 41.

The final inventive method step of the instant invention is shown in FIG. 8. In this step the edge bead 43 may be broken or cut at an appropriate point or folded and said edge bead 43 together with the flash 41a is then manually torn from the finished article 45 to complete the manufacturing process and provide a finished article 45 wherein the edges of the backing layer 41 conform closely to the edge bead 42 of the finished pattern 14b. It should be appreciated that, while a preferred sequence of method steps has been described, the steps shown in FIG. 5 and 8 could be reversed in that the flash 41a and flash bead 43 could, under appropriate circumstances, be ripped from the finished article 45 while the intermediate article 32 is still in the mold 10. The finished article of manufacture, a place mat 45, is shown schematically in FIGS. 9 and 10.

It will be appreciated that a variety of apparatus generally equivalent to that shown diagrammatically in FIG. 1 could be used in the practice of my method, this invention being unrelated to the specific apparatus illustrated except to the mold or die employed. For instance, other apparatus could be used for applying one or both layers of plastisol or different cooling apparatus could be used. Also, it should be appreciated that the expression "plate" as used herein with reference to the molds or dies includes curved plates as well as flat plates and even a cylinder wall provided with mold cavities.

Further, only the basic method has been described herein. Without departing from the spirit of this invention additional layers or laminations could be applied on top of the second or backing layer, curing could be performed between plastisol applications, or the mold stripping and flash stripping steps could be reversed or combined. Also, this invention would be useful in forming interior openings in articles of the character described as well as for stripping unwanted edge scrap from the desired finished article.

From the foregoing, it is believed that the method and apparatus for practicing the instant invention as well as the intermediate article of manufacture thereof will be readily comprehended by persons skilled in the art. It is to be clearly understood, however, that various changes in the apparatus herewith shown and described and in the method of practicing the invention outlined above may be resorted to without departing from the spirit of the invention as defined by the appended claims.

Having thus described my invention, what I claim and desire to protect by Letters Patent is:

1. An intermediate article of manufacture in the manufacture of a finished article of plastic material comprising: a cured flexible plastic sheet of substantially uniform thickness having bonded to one surface thereof at least one pair of closely spaced continuous beads of cured flexible plastic material, said beads in said sheet being bonded to each other throughout the extent of their mutually contacting surfaces the space between said beads demarcating said desired finished article from the unwanted scrap material comprising the rest of said sheet said sheet being thin enough to be readily torn manually between said closely spaced beads.

2. An intermediate article of manufacture comprising: a cured sheet of flexible plastic material of substantially uniform thickness having bonded to one surface thereof an intermediate pattern of beads of cured flexible plastic material, said intermediate pattern including the desired finished bead pattern completely enclosed by a continuous pattern bead forming the outer edge of said finished pattern and including also a continuous flash bead not forming part of said finished pattern said flash bead completely surrounding said pattern bead and being closely spaced with respect thereto, said intermediate bead pattern and said sheet being bonded to each other throughout the extent of their mutually contacting surfaces, said sheet being thin enough to be readily torn manually between said pattern bead and said flash bead.

3. An intermediate article of manufacture in the manufacture of patterned plastic sheet-like articles comprising: a cured sheet of flexible plastic material of substantially uniform thickness having bonded to one surface thereof an additional intermediate pattern layer of cured flexible plastic material, said intermediate pattern layer including the desired finished pattern completely enclosed by a continuous pattern bead forming the outer edge of said desired finished pattern and including also an additional area of flexible plastic material not forming part of said desired finished pattern said additional area completely surrounding said pattern bead and being closely spaced with respect thereto, said intermediate pattern layer and said sheet being bonded to each other througout the extent of their mutually contacting surfaces, said sheet being thin enough to be readily torn manually between said pattern bead and said additional area of flexible plastic material.

References Cited

UNITED STATES PATENTS

| 1,908,075 | 5/1933 | Stalder | 156—246 |
| 2,143,141 | 1/1939 | Cooley. | |
| 2,729,010 | 1/1956 | Markus et al. | 156—267 X |

ALEXANDER WYMAN, *Primary Examiner.*

W. A. POWELL, *Assistant Examiner.*